No. 612,145. Patented Oct. 11, 1898.
E. S. SPERRY & H. W. OLMSTED.
MEANS FOR MENDING PUNCTURES IN RUBBER TIRES.
(Application filed June 30, 1898.)

(No Model.)

Witnesses
A. L. Rathbuner.
Anita Loomis.

Inventors
Edwin S. Sperry
Henry W. Olmsted
By W. E. Simonds
Attorney

UNITED STATES PATENT OFFICE.

EDWIN S. SPERRY, OF WAREHOUSE POINT, AND HENRY W. OLMSTED, OF HARTFORD, CONNECTICUT.

MEANS FOR MENDING PUNCTURES IN RUBBER TIRES.

SPECIFICATION forming part of Letters Patent No. 612,145, dated October 11, 1898.

Application filed June 30, 1898. Serial No. 684,782. (No model.)

*To all whom it may concern:*

Be it known that we, EDWIN S. SPERRY, residing at Warehouse Point, and HENRY W. OLMSTED, residing at Hartford, in the county of Hartford, State of Connecticut, citizens of the United States of America, have invented an Improvement in Means for Mending Punctures in Rubber Bicycle-Tires, of which the following is a description, reference being had to the accompanying drawings, wherein—

Figure 1:
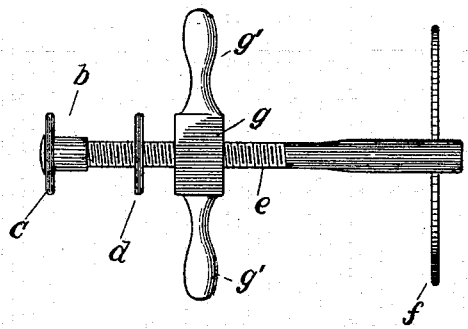
Figure 2:
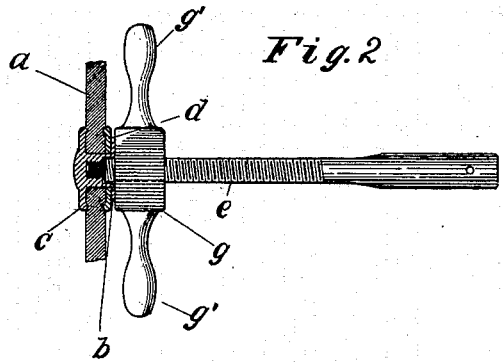

Figure 1 is a view of a device for the practice of such improvement. Fig. 2 is a view of the same device applied to the mending of a puncture in a tire and with the tire and appurtenant parts represented as cut in section on an axial plane of the shank and collars.

The object of the improvement is expressed in its title—to wit, the mending of punctures in rubber bicycle-tires.

In the accompanying drawings the letter $a$ denotes a rubber bicycle-tire of the ordinary construction.

The letter $b$ denotes an interiorly-screw-threaded shank having the collar $c$ fixedly attached thereto, and by preference the parts $b$ and $c$ are made integral each with the other.

The letter $d$ denotes a collar adapted to be borne on the shank $b$, but not fixed thereto.

The letter $e$ denotes a shaft bearing exteriorly a screw-thread fitting to the thread which is upon the interior of shank $b$.

The letter $f$ denotes a handle by which shaft $e$ may be rotated.

The letter $g$ denotes an upsetting-nut carried on a thread on shaft $e$. At the sides it bears handles $g'$, by which this nut can be rotated with considerable force.

The manner of use of these parts is as follows: A puncture having been found in a bicycle-tire the parts are assembled as shown in Fig. 1 and collar $c$ is pushed through the puncture, so as to be upon the inside of the tire and rest against the inner surface thereof. Then the loose collar $d$ is pushed down against the outside of the tire. Then by means of the upsetting-nut $g$ the tire is made to be firmly pinched between the two collars and the shank is upset, as shown in Fig. 2, holding all the parts firmly and permanently in that condition and firmly and permanently closing the puncture. This closing operation having been finished, the shaft $e$ is unscrewed and detached from the shank $b$.

By preference the thread upon shaft $e$, which screws into shank $b$, runs in one direction and the thread which carries the upsetting-nut runs in the opposite direction.

We claim as our improvement—

1. In combination, the interiorly-threaded shank having the collar fixedly attached thereto, the collar adapted to be borne loosely on said shank, the shaft threaded exteriorly for screwing into said shank, and the upsetting-nut carried upon a thread on said shaft, all substantially as described and for the purposes set forth.

2. In combination, the interiorly-threaded shank having the collar fixedly attached thereto, the collar adapted to be borne loosely on said shank, the shaft threaded exteriorly for screwing into said shank, and the upsetting-nut provided with operating-handles and carried upon a thread on said shaft, all substantially as described and for the purposes set forth.

EDWIN S. SPERRY.
HENRY W. OLMSTED.

Witnesses:
   W. E. SIMONDS,
   ANITA LOOMIS.